US010037611B2

(12) United States Patent
van 't Woud et al.

(10) Patent No.: US 10,037,611 B2
(45) Date of Patent: Jul. 31, 2018

(54) METHOD AND APPARATUS FOR GENERATING MAP DATA FROM IMAGES

(71) Applicant: Andromeda Holding B.V., Leiderdorp (NL)

(72) Inventors: Johannes Salomon Sebastiaan van 't Woud, Leiderdorp (NL); Ramy T. Mikhaiel, Cairo (EG)

(73) Assignee: Andromeda Holding B.V., Leiderdorp (NL)

( * ) Notice: Subject to any disclaimer, the term of this patent is extended or adjusted under 35 U.S.C. 154(b) by 81 days.

(21) Appl. No.: 15/184,279

(22) Filed: Jun. 16, 2016

(65) Prior Publication Data

US 2017/0365064 A1    Dec. 21, 2017

(51) Int. Cl.
| | |
|---|---|
| *G06K 9/46* | (2006.01) |
| *G06T 7/33* | (2017.01) |
| *G06T 17/05* | (2011.01) |
| *G06T 7/11* | (2017.01) |

(52) U.S. Cl.
CPC .................. *G06T 7/33* (2017.01); *G06T 7/11* (2017.01); *G06T 17/05* (2013.01); *G06T 2207/10032* (2013.01)

(58) Field of Classification Search
CPC ... G06T 7/33; G06T 7/11; G06T 17/05; G06T 2207/10032
See application file for complete search history.

(56) References Cited

U.S. PATENT DOCUMENTS

| | | | | |
|---|---|---|---|---|
| 6,370,476 | B1 * | 4/2002 | McBride | G01S 1/04 |
| | | | | 33/320 |
| 8,525,835 | B1 * | 9/2013 | Wu | G01S 17/89 |
| | | | | 345/419 |
| 9,503,177 | B1 * | 11/2016 | Shi | H04B 7/18519 |
| 9,672,759 | B2 * | 6/2017 | Hofmann | G09B 29/003 |
| 2014/0064624 | A1 * | 3/2014 | Kim | G06K 9/0063 |
| | | | | 382/201 |
| 2015/0163240 | A1 * | 6/2015 | Geigel | H04L 63/1441 |
| | | | | 726/23 |

(Continued)

OTHER PUBLICATIONS

Search Report dated Nov. 12, 2015 for Netherlands Application No. NL2014000.

(Continued)

*Primary Examiner* — Gregory M Desire
(74) *Attorney, Agent, or Firm* — The Mueller Law Office, P.C.

(57) ABSTRACT

A method for mapping a geographical location of a feature in a satellite image is provided. An image of a geographical surface is obtained, the image comprising a plurality of pixels, data indicating the latitude and longitude of each vertex of the image and data relating to a grid corresponding to the image is obtained. A grid location of a feature in the image is received, the grid location identifying a cell in the grid. The grid location is translated into a geographical location, which comprises calculating a pixel space location of at least one vertex of the identified grid cell; converting the pixel space into a latitude/longitude space based on the obtained data indicating the latitude and longitude of each vertex; and determining the latitude and longitude of the at least one vertex of the identified cell, based on the calculated pixel space location and the latitude/longitude space.

19 Claims, 6 Drawing Sheets

(56) References Cited

U.S. PATENT DOCUMENTS

2017/0365064 A1* 12/2017 van 't Woud .......... G06T 17/05

OTHER PUBLICATIONS

Van'T Woud, et al., Cerberus: The Mars Crowdsourcing Experiment, Communicating Astronomy with the PUblic Journal, Jun. 2012, pp. 28-34.
Van'T Woud, The Mars Crowdsourcing Experiment: Is crowdsourcing in the form of a serious game applicable for annotation in a semantically-rich research domain?, IEEE 2011 16th International Conference on Computer Games, Jul. 27, 2011, pp. 201-208.

* cited by examiner

METHOD AND APPARATUS FOR GENERATING MAP DATA FROM IMAGES

TECHNICAL FIELD OF THE INVENTION

The invention relates to a method and apparatus for generating map data from images, and in particular to a method and apparatus for mapping a geographical location of a feature in a satellite image.

BACKGROUND TO THE INVENTION

Satellites which photograph planetary surfaces generate vast amounts of data. Such satellites include both Earth monitoring satellites and satellites orbiting other bodies in the solar system. Typically, the number of researchers available to process the satellite data is relatively small. As a result, only a fraction of the available data gets processed, meaning that many important discoveries might remain hidden.

One way in which the problem of processing large amounts of image data has been tackled is using crowdsourcing. Crowdsourcing is the process of obtaining needed services, ideas, or content by soliciting contributions from a large group of people, and especially from an online community. For example, the Zooniverse web portal hosts a variety of projects which use online volunteers to process scientific data. Once such project is Galaxy Zoo, which shows volunteers images of galaxies obtained by space telescopes and asks them to classify the objects shown in the images. The original Galaxy Zoo project ran for two years, and during that time more than 150,000 people contributed, allowing the 900,000 galaxies imaged by the Sloan Digital Sky Survey to be classified in months, rather than the years it would have taken using traditional methods.

For many applications it would be desirable not only to locate and/or classify a feature in an image, but also to be able to determine the real-world location of that feature. For example, when a natural disaster has occurred, satellite images showing the damage quickly become available. If the geographical locations (i.e. accurate latitude and longitude values) of features shown in the satellite images (e.g. collapsed buildings, broken bridges, fallen trees, etc.) could rapidly be determined, emergency services could be provided with accurate and up-to date maps of the disaster region which would greatly assist in the relief effort.

It is therefore desirable to have a fast and accurate system for determining the geographical location of any given point in a satellite image. Such as system could advantageously be used in conjunction with a crowdsourcing platform to rapidly identify features of a specified type in the image data and generate a map showing the geographical locations of the identified features.

SUMMARY OF THE INVENTION

According to a first aspect of the invention, there is provided a method for mapping a geographical location of a feature in a satellite image. The method comprises:
obtaining an image of a geographical surface, wherein the image comprises a plurality of pixels;
obtaining data indicating the latitude and longitude of each vertex of the image;
obtaining data relating to a grid corresponding to the image;
receiving a grid location of a feature in the image, wherein the grid location identifies a particular grid cell in the grid; and
translating the grid location into a geographical location;
wherein translating the grid location into a geographical location comprises:
calculating a pixel space location of at least one vertex of the identified grid cell;
converting the pixel space of the image into a latitude/longitude space based on the obtained data indicating the latitude and longitude of each vertex of the image; and
determining the latitude and longitude of the at least one vertex of the identified grid cell, based on the calculated pixel space location and the latitude/longitude space output by the converting.

In some embodiments the method further comprises applying one or more transformations to the obtained image.

In some embodiments obtaining data relating to a grid corresponding to the image comprises defining a grid corresponding to the image. In some such embodiments the method further comprises applying the grid to the image and sending the grid and image to a crowdsourcing platform. In some embodiments obtaining the data relating to a grid comprises receiving data relating to a grid from a crowdsourcing platform.

In some embodiments, the data relating to the grid received from the crowdsourcing platform comprises data from multiple groups of users. In some embodiments, the data relating to the grid received from the crowdsourcing platform comprises data from three or more groups of users.

In some embodiments the grid is a hexagonal grid. In some alternative embodiments the grid is a square grid.

In some embodiments translating the grid location into a geographical location comprises calculating a pixel space location of each vertex of the identified grid cell; and determining the latitude and longitude of each vertex of the identified grid cell. In some embodiments translating the grid location into a geographical location further comprises determining the latitude and longitude of a centre point of the identified grid cell. In some embodiments the grid location is received from a crowdsourcing platform.

In some embodiments, the grid location is determined based on a combined input of multiple groups of users of the platform. In some embodiments, the grid location is determined based on a combined input of three or more groups of users of the platform.

In some embodiments the method further comprises generating a map layer including the geographical location of the feature.

In some embodiments receiving a grid location of a feature in the image comprises receiving a first grid location of a first feature in the image and receiving a second grid location of a second feature in the image. In some such embodiments translating the grid location into a geographical location comprises translating the first grid location into a first geographical location and translating the second grid location into a second geographical location. In some such embodiments the first feature and the second feature are of the same type and the generated map layer includes the first geographical location and the second geographical location. In some such embodiments the first feature and the second feature are of different types, and the generated map layer includes the first geographical location. In some such embodiments the method further comprises generating an additional map layer which includes the second geographical location.

There is also provided, according to a second aspect of the invention, a computer program product, comprising computer readable code embodied therein, the computer readable code being configured such that, on execution by a suitable computer or processor, the computer or processor performs the method of the first aspect.

There is also provided, according to a third aspect of the invention, an apparatus for mapping a geographical location of a feature in a satellite image. The apparatus comprises a processing unit. The processing unit is arranged to obtain an image of a geographical surface, wherein the image comprises a plurality of pixels; obtain data indicating the latitude and longitude of each vertex of the image; obtain data relating to a grid corresponding to the image; receive a grid location of a feature in the image, wherein the grid location identifies a particular grid cell in the grid; and translate the grid location into a geographical location. The processing unit is arranged to translate the grid location into a geographical location by calculating a pixel space location of at least one vertex of the identified grid cell; converting the pixel space of the image into a latitude/longitude space based on the obtained data indicating the latitude and longitude of each vertex of the image; and determining the latitude and longitude of the at least one vertex of the identified grid cell, based on the calculated pixel space location and the latitude/longitude space output by the converting.

Various other embodiments of the apparatus are also contemplated in which the processing unit is further configured to execute any of the above-described method steps.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE PREFERRED EMBODIMENTS

Figure 1:
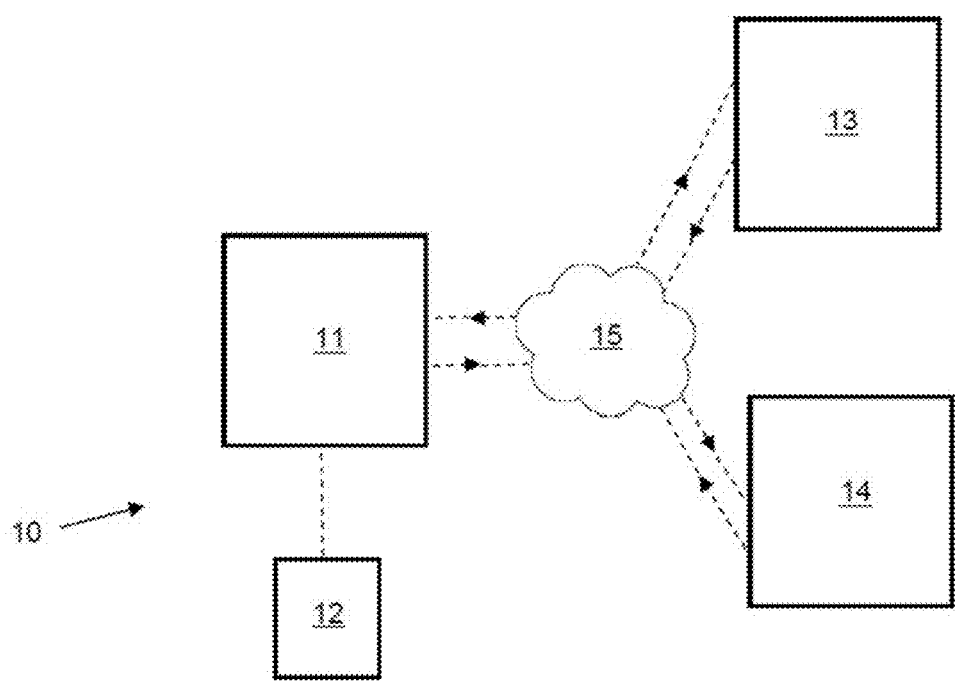
FIG. 1 is an illustration of an apparatus for mapping a geographical location of a feature in a satellite image, according to a general embodiment of the invention.

Embodiments of the invention provide a system for determining the geographical location of a feature in a satellite image. FIG. 1 shows an apparatus 10 according to a first embodiment of the invention. The apparatus 10 comprises a processing unit 11, which is in communication (via a wired or wireless communications link) with a memory 12. The processing unit 11 is also in communication (via wired or wireless communications link) with a source 13 of satellite images and a source 14 of image feature location data. In preferred embodiments the source 13 of satellite images and the source 14 of image feature location data are both remote from the processing unit 11 and the communication between the sources 13, 14 and the processing unit is via a communications network 15 (e.g. the internet). In some embodiments the source 13 of satellite images is server located at a third party owner/generator of such images, such as the European Space Agency.

In some embodiments the source 14 of image feature location data is a crowdsourcing platform hosted on a remote web server. The crowdsourcing platform can be configured to acquire image feature location data from one or more sources (i.e. from a single source or from multiple sources). A source can be a user of the platform (for example, a single user or a plurality of users), or a crowd or group of users of the platform (for example, one group of users, two groups of users, three groups of users, four groups of users or any other number of groups of users). The more users, crowds or groups of users used to acquire image feature location data, the higher the precision of the determined geographical location of a feature in a satellite image. Alternatively, the source 14 of image feature location data can be a computer belonging to a researcher or research organization.

Figure 2:
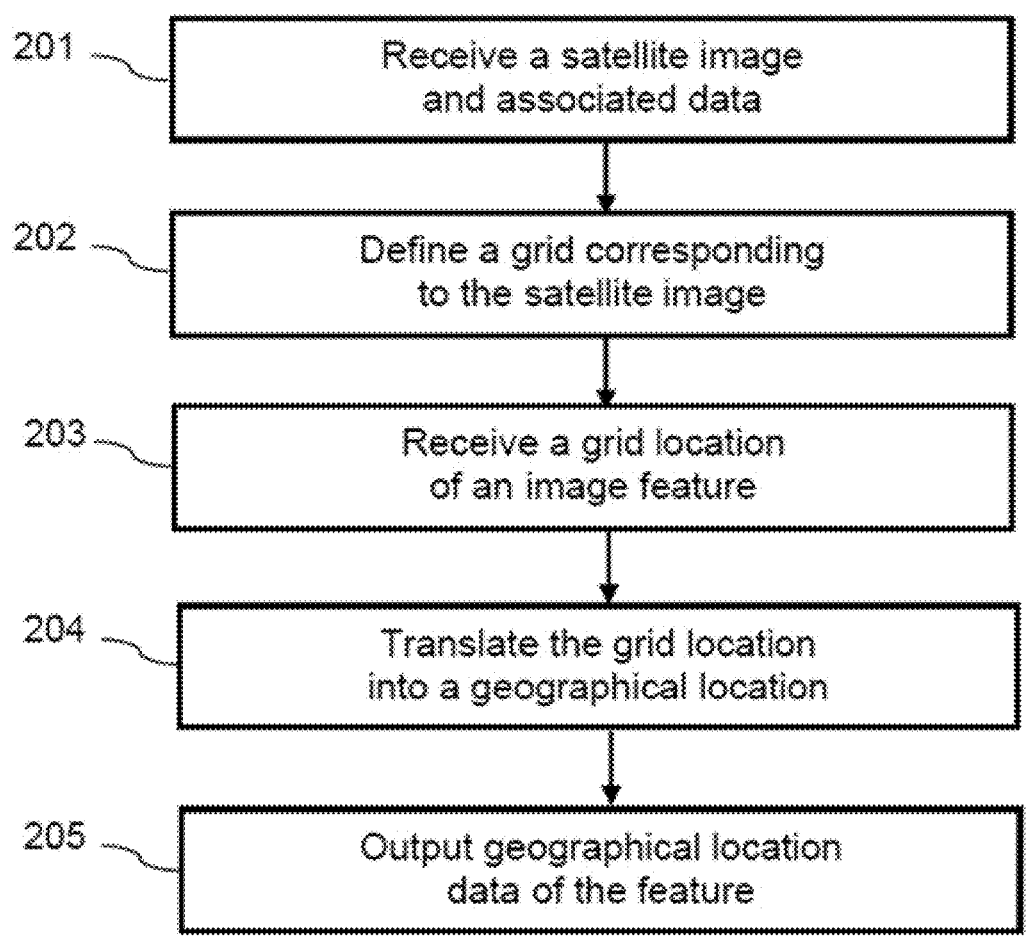
FIG. 2 is a flow chart illustrating a method for mapping a geographical location of a feature in a satellite image, according to a general embodiment of the invention.

FIG. 2 illustrates a method for determining the geographical location of a feature in a satellite image, e.g. using the apparatus 10, according to a general embodiment of the invention. In a first step 201 the processing unit 11 receives data from the source 13 of satellite images. The received data is stored in the memory 12. The data comprises a satellite image, the size of the image in pixels, the resolution of the image, and data indicating the latitude and longitude of each vertex of the image. In some embodiments the received data is received in the form of one or more image files (e.g. .tiff files) and one or more data files (e.g. .xml files). The satellite image comprises a plurality of pixels. In preferred embodiments the satellite image is square or rectangular, and is substantially aligned with the latitude and longitude of the surface which is the subject of the image. Generally satellite images are provided by the image provider properly projected such that north is at the top of the image. It will be appreciated that in such embodiments the data indicating the latitude and longitude of each vertex of the image can comprise an indication of the latitude and/or longitude of each edge of the image.

In step 202 the processing unit defines a grid corresponding to the satellite image (i.e. the area of the grid matches the area of the image). The grid comprises a plurality of equally sized grid cells. In preferred embodiments the grid is a hexagonal grid, although other types of grid can be used. The size of the grid cells is determined in dependence on the width and height of the image and/or on the resolution of the image. For example, in a particular embodiment, a hexagonal grid in which each cell is 80×50 pixels is defined for a satellite image having a resolution of 40 cm/pixel. Therefore each grid cell corresponds to a real-world hexagonal region 32 m wide and 23.6 m high. Preferably the width of each grid cell is less than 120 pixels. In some embodiments the size of the grid cells is selected such that both the width and the height of the image are an integer number of grid cells.

The grid is used (e.g. by a researcher, or a crowdsourcing platform) to locate the position of interesting features within the image. As such, in some embodiments the image with the grid applied to it is sent to the source 14 of image feature location data for use in the generation of image feature location data. In alternative embodiments, the processing unit 11 does not itself define the grid, but instead receives data relating to a grid from an external source. In some such embodiments the processing unit 11 receives data relating to a grid from the source 14 of image feature location data. In such embodiments the data relating to the grid comprises at least a height of the grid (in number of cells), a width of the grid (in number of cells) and the cell size and shape (in pixels). In some such embodiments the grid is defined by a processing unit of the source 14 of image feature location data, e.g. following sending of the image data to the source 14 by the processing unit 11 or by the source 13 of satellite image data.

Image feature location data can be generated using various techniques known to the skilled person. However; a crowdsourcing platform provides an advantageous way to generate image feature location data because it enables a vast amount of image data to be processed very quickly. An exemplary crowdsourcing platform for locating features in images displays an image (or a portion thereof) to a user of the platform, and motivates them to identify features of a specific type by clicking on the location of any such features they see in the image. The location of a click with respect to the grid (e.g. which grid cell it is within) is then determined by the crowdsourcing platform.

The same image will be shown to other platform users. For example, the same image will be shown to a plurality, many or all of the platform users, or to one or more crowds or groups of users (for example, one group of users, two groups of users, three groups of users, four groups of users or any other number of groups of users) of the platform. The inputs of these users are combined to enable the location of an interesting feature to be determined with high accuracy. For example, locations which only a few users have clicked on are discarded, whilst locations which all or most users have clicked on can be determined to be feature locations with a high degree of certainty. The more users, crowds or groups of users that identify a feature in an image, the higher the precision of the determined location of the feature in the image. For example, using three crowds (or groups) of users instead of one can increase the precision by a factor of six. The grid locations generated by the combining process are then output, e.g. to the processing unit 11.

Figure 3:
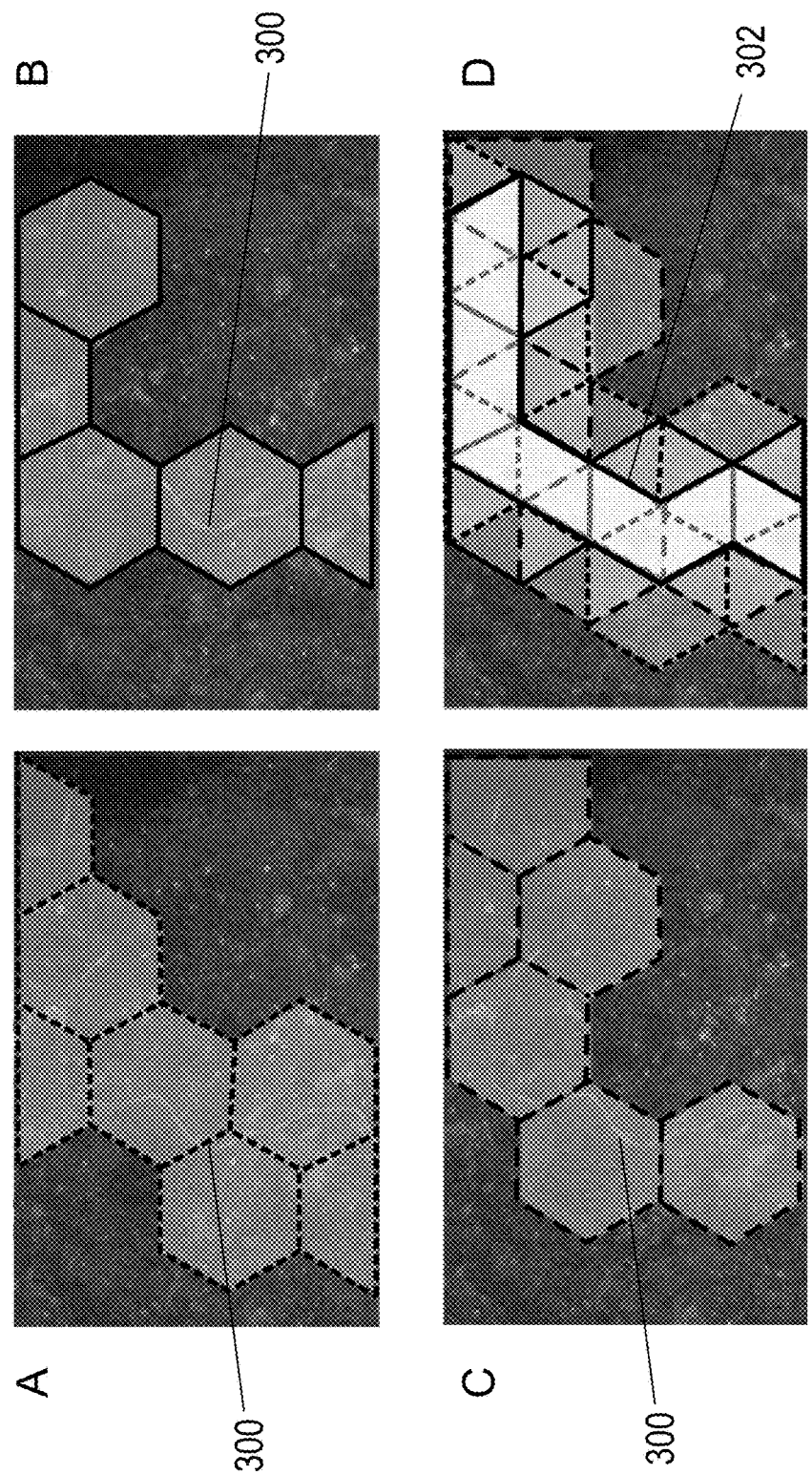
FIG. 3 is a screenshot of a satellite image that is processed according to an embodiment of the invention.

FIG. 3 is a screenshot of a satellite image that is processed according to an embodiment that uses multiple groups of users. According to this embodiment, a feature in the satellite image is a road 300 and the geographical location of the road 300 is determined based on the combined inputs received from multiple groups of users indicative of the location of the road 300 within the satellite image.

FIG. 3A illustrates the cells of the grid for which input is received from a first group of users A. FIG. 3B illustrates the cells of the grid for which input is received from a second group of users B. FIG. 3C illustrates the cells of the grid for which input is received from a third group of users C. The first group of users A may only be provided with the grid area shown in FIG. 3A, the second group of users B may only be provided with the grid area shown in FIG. 3B (which is spatially shifted horizontally from the grid area provided to the first group of users A), and the third group of users C may only be provided with the grid area shown in FIG. 3C (which is spatially shifted vertically from the grid area provided to the first group of users A). Each of the three groups of users A, B and C may then be requested to provide information on the geographical location of the road 300 within those grid areas.

FIG. 3D illustrates the combined input from the first group of users A, the second group of users B, and the third group of users C. As shown, it is possible to acquire information relating to smaller triangular areas within the hexagonal grid, which are one sixth of the size of the hexagonal areas of the grid, and it is thus possible to provide increased mapping precision. The combined inputs received from the three groups of users A, B and C that are indicative of the geographical location of the road 300 are used to highlight the areas of the grid in which the road is present 302. In this way, the general shape of the road can be mapped out.

Returning 2 back to FIG. 2, in step 203 the processing unit 11 receives data from the source 14 of image feature location data. The data comprises a grid location of an image feature (a collapsed building, for example, if the satellite image is of a disaster region). The grid location identifies a particular cell in the grid and comprises x and y coordinates (where the x coordinate identifies a number of cells along a first axis of the grid and the y coordinate identifies a number of cells along a second axis of the grid.

In step 204 the processing unit 11 translates the grid location into a geographical location, using the following process. First, the pixel space locations of each vertex of the grid cell identified by the feature location data are calculated. Then, the pixel space of the image is converted into a latitude/longitude space. This is done based on the data indicating the latitude and longitude of each vertex of the satellite image which was received from the source 13 of satellite images and information about the image (e.g. the height and width of the image in pixels). Once the conversion has been performed, the resulting latitude/longitude space is used to determine the latitude and longitude of at least one vertex of the identified grid cell. In some embodiments the latitude and longitude of all vertices of the identified grid cell is determined. In some embodiments the latitude and longitude of the centre point of the identified grid cell is calculated, using the determined latitude and longitude of the at least one vertex. In some embodiments the latitude and longitude of a selected one of the cell vertices is determined to be the geographical location of the image feature. In alternative embodiments the latitude and longitude of the centre point of the identified grid cell is determined to be the geographical location of the image feature. The precision of the determined geographical location depends on the grid cell size, and therefore on the resolution of the original satellite image. In preferred embodiments the precession of the determined geographical location is less than 25 m.

In step 205 the geographical location of the image feature is output by the processing unit 11, e.g. in the form of a GIS data file. In some embodiments the geographical location is sent to the source 13 of the satellite image data. In some embodiments the processing unit compiles a plurality of geographical locations into a single data set and then outputs the data set. In some such embodiments the data set comprises one or more map layers (e.g. GIS layers). In some such embodiments a map layer is generated for each type of feature identified in the image, such that a given layer will include the geographical locations of all identified features of a given type (for instance, if the satellite image is of a disaster region, one layer could be created for collapsed buildings, a second layer for fallen trees, etc.). In some embodiments the data set comprises a map.

Aspects of a specific embodiment of the invention, hereinafter referred to as the Cerberus system, will now be described. The Cerberus system comprises a crowdsourcing platform and a client server. The crowdsourcing platform has a user interface in the form of a web-based computer game. The client server has a customer interface via which users can upload satellite images and subsequently receive location data for features of those images. The term "users" will hereafter be used to refer to parties who supply satellite images and receive map data corresponding to those images, whereas the term "players" will be used to refer to parties using with the crowdsourcing platform. The client server also includes a processing engine.

The satellite images input to the client server can be of any origin. They ideally should have a spatial resolution of at least 1 m, but higher values would also be possible. Preferably the satellite images input to the Cerberus system have a spatial resolution of at least 50 cm. The maximum size of image that can be input into the Cerberus system is 40 000 by 20 000 pixels (0.8 gigapixels). The input satellite images can include two photographic layers (e.g. Infrared (IR) and color). Meta information comprising planetary coordinates (i.e. latitude and longitude of each edge of the image), image size, and image resolution for each satellite image is also input to the client server by the user, via the customer interface. This interface also provides a form on which the user can indicate any specific requirements they have for the map data (e.g. types of features to be located, number of map layers to be created, etc.) that will be generated by the Cerberus system.

Satellites are of different configurations and offer different file formats. The processing engine of the client server is therefore arranged to convert the raw satellite image into the geographic TIFF format. The processing engine also applies various corrections to the satellite images. Satellite photographs can have a rotation, or may not be exactly perpendicular to the surface which is the subject of the photograph (which will, of course, be a section of a sphere rather than a flat plane. Also, tall features on the edges of satellite images (such as buildings) are seen slightly from the side. The processing engine applies image processing algorithms to at least partially remove these effects. Then each satellite image is divided into pieces for use by the Cerberus game, so that players do not need to download a whole satellite image (instead just a single piece is presented to the player at any given time during game play). Additionally, the meta information received along with the images is used by the system to georeference the satellite images.

A prototype version of the Cerberus game used by the crowdsourcing platform of the Cerberus system has been used to map the surface of Mars using satellite images obtained by Nasa's Mars Reconnaissance Orbiter (MRO). These images were subdivided and presented to players of the Cerberus game, who used a toolset to mark features of the Martian surface. Location and orientation data generated by researchers was already available for the MRO images, and this was used to validate the results produced by the Cerberus system. This exercise demonstrated that the Cerberus game could identify image features at least as accurately as the researchers who generated the original location and orientation data, and furthermore the Cerberus players noticed features in the images which were missed in the original analysis. The prototype Cerberus game therefore demonstrated the ability of a crowdsourcing platform in the form of a web-based computer game to generate accurate image location data. However; the prototype Cerberus game was not linked to a client server and included no means for translating the image location data into actual geographic locations.

Figure 4:
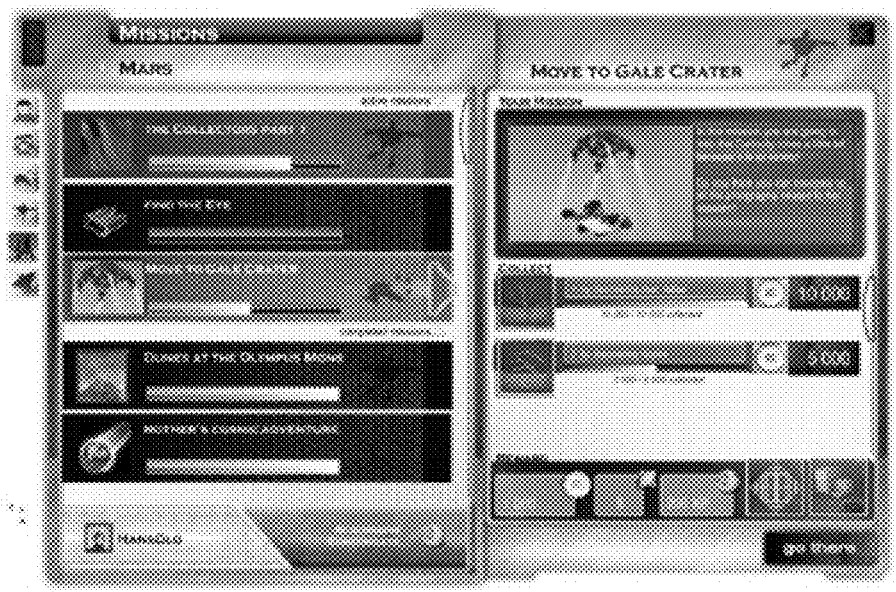
FIG. 4 is a first screenshot of a crowdsourcing game used in conjunction with a specific embodiment of the invention.
Figure 5:
FIG. 5 is a second screenshot of the crowdsourcing game of FIG. 4.

The crowdsourcing platform of the current embodiment uses an updated and expanded version of the prototype Cerberus game, and is in communication with the client server to receive images for use in the game and to send the location data generated by the game back to the server for processing. The goal of the game is to construct a base of operations, while navigating around a landscape based on the satellite image. Identifying features in the image earns credits for a player, which allows them to construct buildings and units. Additionally, each player is given particular missions to perform (e.g. rescue an astronaut from the Martian desert, or locate the Curiosity lander). Generally the missions require the players to carry out tasks involving finding important features which need to be mapped. FIGS. 4 and 5 are screenshots of the Cerberus game running in an internet browser. FIG. 4 shows an overview screen on which a player can view their completed and active missions as well as the number of credits they have. FIG. 5 shows a screen during the performance of a mission by a player. It can be seen that game items (in this case, supply trucks and buildings) are superimposed on a satellite image of the Martian surface. The hexagonal grid used to define the locations of image features can also be seen in FIG. 5.

Figure 6:
FIG. 6 is a third screenshot of the crowdsourcing game of FIG. 4.
Figure 7:
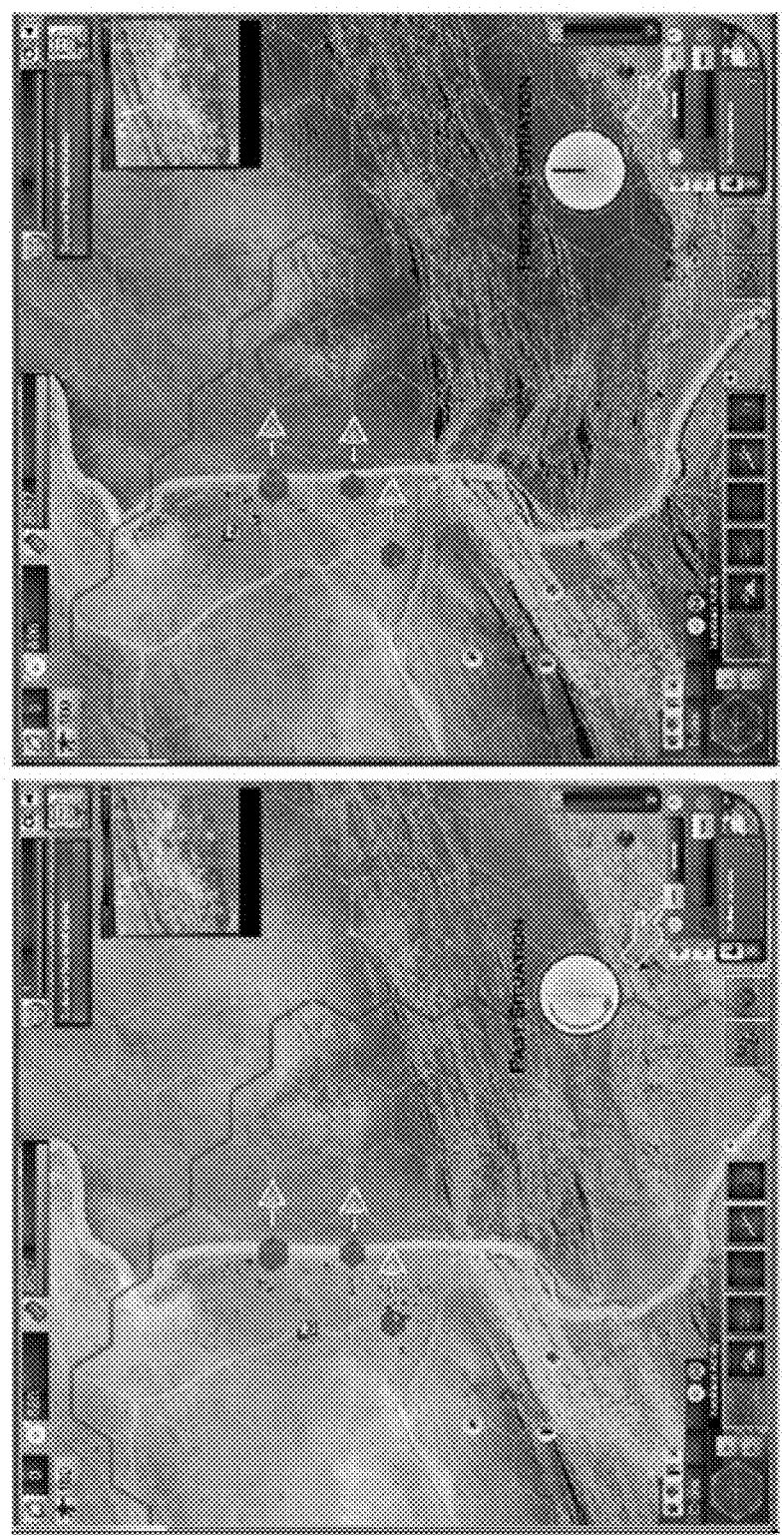
FIG. 7 is a fourth screenshot of the crowdsourcing game of FIG. 4.

The game items and missions can be tailored to the nature of the satellite images which it is desired to generate geographical location data for. For example, FIGS. 6 and 7 show a screenshot of an alternative version of the Cerberus game, designed for use in mapping disaster regions based on satellite images of Earth. It can be seen in FIG. 6 that the player is provided with specific tools to mark the location of disaster related features such as flooding, collapsed buildings, etc. FIG. 7 shows a screen during the performance of a mission by a player in which three probes have been used to indicate interesting features. The screen is simultaneously displaying a satellite image from a previous time (e.g. several hours or days ago), and a current satellite image. Thus it can be seen that some of the features in the area marked by the probes have moved between the time of the first image and the time of the second image.

The image location data output by the Cerberus game is processed by the processing engine of the client server as follows. First, the processing engine converts the center position of the satellite image to latitude and longitude using the following procedure:

Get tileCenterX, tileCenterY from the client request

Get maximumLatitude, minimumLatitude, maximumLongitude, minimumLongitude, map Width, mapHeight from the database.

Var latitudeDifference=maximumLatitude−minimumLatitude.

Var longitudeDifference=maximumLongitude−minimumLongitude.

Var pixel Width=longitudeDifference map Width.

Var pixelHeight=latitudeDifference/mapHeight.

Var finalLongitude=tileCenterX*pixel Width+minimumLongitude.

Var finalLatitude=tileCenterY*pixelHeight+minimumLatitude.

Then the above technique is used to convert the pixel space into latitude/longitude space. Finally, the latitude and longitude of the six vertices of the hexagonal grid cell identified by the image feature location data is calculated using the following procedure:

CenterLongitude=a cos(sin(deg2rad finalLatitude))*sin(deg2rad(finalLatitude))+cos(deg2rad(finalLatitude))*cos(deg 2rad(finalLatitude))*cos(deg2rad(1)))*6371*1000

CenterLatitude=a cos(sin(deg2rad(finalLatitude))*sin(deg2rad(finalLatitude+1))+cos(deg2rad(finalLatitude))*cos(deg2rad(finalLatitude+1))*cos(deg2rad(0)))*6371*1000 hexWidth=hexagonalGridWidth*mapResolution/CenterLongitudeInMeters
hexHeight=hexagonalGridHeight*mapResolution/CenterLatitude;
hexRatio=hexWidth/hexHeight
p1X=finalLongitude−hexWidth/2
p1Y=finalLatitude
p2X=finalLongitude−hexWidth/4
p2Y=finalLatitude−hexHeight/2
p3X=finalLongitude+hexWidth/4
p3Y=finalLatitude−hexHeight/2;
p4X=finalLongitude+hexWidth/2;
p4Y=finalLatitude;
p5X=finalLongitude+hexWidth/4;
p5Y=finalLatitude+hexHeight/2;
p6X=finalLongitude−hexWidth/4;
p6Y=finalLatitude+hexHeight/2.

The latitude and longitude of the six vertices of the hexagon are saved into a spatial database along with the feature type, so that they can be output to the user on demand.

The Cerberus system is configured to output the latitude and longitude locations in the form of map layers which are sharable with existing GIS systems. The geographical location data generated by the Cerberus system can be sent to the user in the form of processed files, for input into the user's own mapping software. However, the client server also provides in-built functionality for creating and editing maps. A user can therefore use the generated data via the customer interface of the client server and does not need to have their own mapping software or to download the data. This allows the possibility for the geographical location data to be updated in real-time, as the crowdsourcing platform outputs more or improved image location data.

There is therefore provided a method and apparatus that can rapidly generate accurate geographical location data from satellite images. This advantageously permits scientific research data to be analyzed rapidly, particularly when embodiments of the invention are used in conjunction with a crowdsourcing platform. It also advantageously permits accurate maps to be created and updated very quickly, making it feasible to reflect transient and/or moveable features on such maps.

It is envisaged that embodiments of the invention can be beneficially applied in many diverse situations. For example, in space research embodiments of the invention could be employed in mapping other planets, identifying similarities between other planets and the Earth, locating space debris, and/or identifying extra-solar planets. In Earth observation embodiments of the invention could be employed in mapping disaster regions, monitoring infrastructure such as dykes and pipelines, monitoring logging and deforestation, locating archeological sites, evaluating vineyards and farmland, and monitoring the effects of climate change.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for mapping a geographical location of a feature in a satellite image, the method comprising:
   obtaining an image of a geographical surface, wherein the image comprises a plurality of pixels;
   obtaining data indicating the latitude and longitude of each vertex of the image;
   obtaining data relating to a grid corresponding to the image;
   receiving a grid location of a feature in the image, wherein the grid location identifies a particular grid cell in the grid; and
   translating the grid location into a geographical location;
   wherein translating the grid location into a geographical location comprises:
   calculating a pixel space location of at least one vertex of the identified grid cell;
   converting the pixel space of the image into a latitude/longitude space based on the obtained data indicating the latitude and longitude of each vertex of the image; and
   determining the latitude and longitude of the at least one vertex of the identified grid cell, based on the calculated pixel space location and the latitude/longitude space output by the converting.

2. The method of claim 1, further comprising applying one or more transformations to the obtained image.

3. The method of claim 1, wherein obtaining data relating to a grid corresponding to the image comprises defining a grid corresponding to the image.

4. The method of claim 3, further comprising applying the grid to the image and sending the grid and image to a crowdsourcing platform.

5. The method of claim 1, wherein obtaining the data relating to a grid comprises receiving data relating to a grid from a crowdsourcing platform.

6. The method of claim 5, wherein the data relating to the grid received from the crowdsourcing platform comprises data from multiple groups of users.

7. The method of claim 5, wherein the data relating to the grid received from the crowdsourcing platform comprises data from three or more groups of users.

8. The method of claim 1, wherein the grid is a hexagonal grid.

9. The method of claim 1, wherein translating the grid location into a geographical location comprises calculating a pixel space location of each vertex of the identified grid cell; and determining the latitude and longitude of each vertex of the identified grid cell.

10. The method of claim 1, wherein translating the grid location into a geographical location further comprises determining the latitude and longitude of a centre point of the identified grid cell.

11. The method of claim 1, wherein the grid location is received from a crowdsourcing platform.

12. The method of claim 11, wherein the grid location is determined based on a combined input of multiple groups of users of the platform.

13. The method of claim 11, wherein the grid location is determined based on a combined input of three or more groups of users of the platform.

14. The method of claim 1, further comprising generating a map layer including the geographical location of the feature.

15. The method of claim 14, wherein receiving a grid location of a feature in the image comprises receiving a first grid location of a first feature in the image and receiving a second grid location of a second feature in the image, and wherein translating the grid location into a geographical location comprises translating the first grid location into a first geographical location and translating the second grid location into a second geographical location.

16. The method of claim 15, wherein the first feature and the second feature are of the same type, and wherein the generated map layer includes the first geographical location and the second geographical location.

17. The method of claim 15, wherein the first feature and the second feature are of different types, wherein the generated map layer includes the first geographical location, and wherein the method further comprises generating an additional map layer which includes the second geographical location.

18. A computer program product, comprising computer readable code embodied therein residing in a non-transitory computer readable medium, the computer readable code being configured such that, on execution by a suitable computer or processor, the computer or processor performs the method described in claim 1.

19. An apparatus for mapping a geographical location of a feature in a satellite image, the apparatus comprising:
    a processing unit arranged to:
        obtain an image of a geographical surface, wherein the image comprises a plurality of pixels;
        obtain data indicating the latitude and longitude of each vertex of the image;
        obtain data relating to a grid corresponding to the image;
    receive a grid location of a feature in the image, wherein the grid location identifies a particular grid cell in the grid; and
    translate the grid location into a geographical location;
wherein the processing unit is arranged to translate the grid location into a geographical location by:
    calculating a pixel space location of at least one vertex of the identified grid cell;
    converting the pixel space of the image into a latitude/longitude space based on the obtained data indicating the latitude and longitude of each vertex of the image; and
    determining the latitude and longitude of the at least one vertex of the identified grid cell, based on the calculated pixel space location and the latitude/longitude space output by the converting.

* * * * *